United States Patent [19]

Frey et al.

[11] Patent Number: 4,519,000

[45] Date of Patent: May 21, 1985

[54] MAGNETOGRAPHIC CARRIAGE PRINTER

[75] Inventors: Thomas M. Frey, Webster; Larry A. Kovnat, Rochester, both of N.Y.

[73] Assignee: Xerox Corporation, Stamford, Conn.

[21] Appl. No.: 553,926

[22] Filed: Nov. 21, 1983

[51] Int. Cl.³ ............................................. H04N 1/28
[52] U.S. Cl. .................................................. 358/301
[58] Field of Search ........................... 346/74.2, 74.5; 358/296, 300, 301

[56] References Cited

U.S. PATENT DOCUMENTS

| 3,487,391 | 12/1969 | Todt | 360/119 |
| 3,735,416 | 5/1973 | Otto et al. | 346/74.2 |
| 3,740,265 | 6/1973 | Springer | 427/48 |
| 4,176,362 | 11/1979 | Nelson | 346/74.5 |

OTHER PUBLICATIONS

Articles in the Honeywell Computer Journal by W. Chynoweth et al.; published in 1973 on pp. 103–117, entitled "Pedro A Transducer Per-Track Recording System with Batch Fabricated Magnetic Film Read/Write Transducers".

Primary Examiner—Thomas H. Tarcza
Attorney, Agent, or Firm—Robert A. Chittum

[57] ABSTRACT

Magnetographic copier having a movable carriage on which the process stations for recording, developing, transferring and cleaning are mounted. A ribbon of magnetic tape is threaded through the process stations and is held stationary during the image processing, so that the movement of the carriage causes the tape to pass all of the process stations. A CCD array scans segments of a fixed original document and then returns to a start of scan position where it is stepped. The carriage and CCD array are concurrently stepped a distance substantially equal to width of a segment prior to the next scan. The CCD array and carriage are connected by cable and move concurrently. The elements of the CCD array are connected in a one-to-one manner with elements of a magnetic recording head at the recording station. Start of scan is initiated by sensing accurately placed holes in the magnetic tape and width of scan is controlled by marks on a code strip which are detected by the CCD array elements to adjust the number of elements enabled.

12 Claims, 3 Drawing Figures

MAGNETOGRAPHIC CARRIAGE PRINTER

FIELD OF THE INVENTION

The present invention relates to magnetographic printers or copiers and more particularly to a magnetographic printer or copier with a carriage type architecture which utilizes a thin film recording head array to print bands of an image in a step and repeat manner until the entire image has been created.

DESCRIPTION OF THE PRIOR ART

With today's discrete record head technology, such as described in U.S. Pat. No. 3,487,391 to J. H. Todt, creating a full 8-½ by 11 inch, high resolution imaging is inherently a slow process. Elaborate mechanical systems must be employed in an effort to minimize the recording time. Such measures inevitably add to the cost of a magnetographic printer.

U.S. Pat. No. 3,487,391 mentioned above is directed to the construction and method of making a high-density, discrete magnetic-recording head. It is made up of minute, individual heads, attached side-by-side and insulated from each other. The coils are angularly staggered from each other to allow proper spacing, there being approximately 100 heads for each 0.57 inch of transducer head width.

U.S. Pat. No. 4,176,362 to A. M. Nelson discloses a high density magnetic image recording head which is constructed using printed circuit techniques. The head includes a large number of recorder elements to enable recording across an eight inch width of magnetic tape. After the full page width images are formed on the tape, the magnetic tape moves past a transfer station where the magnetic images are transferred to a magnetic drum and developed with toner. Then the developed images are transferred to paper. Multiple copies of the images can be made by moving the magnetic tape out of contact with the drum and redeveloping the magnetic latent image on the drum after each transfer of the developed image to paper.

Thin film recording heads greatly reduce the recording time over what is presently possible and do so at a significantly reduced cost. For a general discussion of thin film recording heads refer to the article in the Honeywell Computer Journal by W. Chynoweth et al., published in 1973 on pages 103 to 117, entitled "Pedro, A Transducer-Per-Track Recording System with Batch-Fabricated Magnetic Film Read/Write Transducers." Thin film heads can be fabricated on a single substrate at densities of 75 or more to the linear inch, and single arrays of one inch in length are available today. By interleaving several such arrays, 300 pixels or spots per inch resolution can be achieved to keep the recording time for high resolution images to a minimum.

Utilizing the thin film head technology, an acceptable low-cost magnetographic copier having high resolution and graphics capability is possible, if a small width magnetic tape system could be used which has good registration of the individual record tracks that make up the image and good registration of the multiple segments or bands of the developed image can be maintained as it is transferred to the paper. Most important, such a system must be inexpensive, simple and reliable to be commercially feasible.

U.S. Pat. No. 3,740,265 to G. D. Springer relates to an improved magnetic image transfer technique in a printer using a narrow magnetic tape system from which information is transferred to a record sheet on a line-by-line basis. This printer utilizes an endless magnetic tape supplied from a cartridge that is supported on rollers in a continuous loop and is advanced by one or more tape drives. The tape follows a path through an encoding station, developing station and a transfer station. Information to be printed is received by the encoding station in the form of a train of pulses. The encoding station includes a multitrack magnetic recording head that is adapted to record magnetic bits on the tape at selected positions with a standard character matrix to form each given character to be printed. The recording head is controlled by a character generator that assigns the matrix positions for a given character and that is responsive to a decoder circuit. After a magnetic character image is formed the tape is driven through a developing station and then advanced to the transfer station where a pressure plate moves the tape into contact with a record sheet and transfers the developed image on a line-by-line basis. As the tape is associated with the record sheet, the magnetic images on the tape are erased to enhance transfer. The tape is then returned to the cartridge for reuse.

U.S. Pat. No. 3,735,416 to O. J. Ott et al. relates to a magnetographic printing device wherein data is entered onto an endless magnetic tape as a matrix of recorded segments. A magnetic ink or toner is applied to the recorded images and is subsequently transferred onto paper or other receiving surfaces. Individual characters can be printed one at a time or entire lines of data can be imprinted. Information to be printed can be applied to the printing system from a computer, manually operable keyboard or from a remote source via a telephone line or other communication link. At a printing station, the toner is transferred from the recorded portions of the tape onto a confronting surface by means of a low energy mechanism. The tape can be incremented about its path, so that transfer of the toner from the tape can be accomplished during the dwell interval of the intermitten tape motion.

SUMMARY OF THE INVENTION

It is the object of this invention to provide a low-cost, magnetographic copier having relatively high resolution and graphics capability.

It is another object of the invention to provide a magnetographic copier which functions as a real-time raster input scanner/raster output scanner (RIS/ROS) in producing the latent magnetic images on magnetic tape or as an electronic output device which accepts electroniclly created images and, in response thereto, produces latent magnetic images thereof on magnetic tape.

It is a further object of this invention to provide a magnetographic copier which scans a lateral section or band of an original document, write that band of the original document as a latent image on a stationary ribbon of magnetic tape and transfers the developed image to a receiving substrate in a sequential step and repeat manner until the entire original document is reproduced.

It is yet another object of this invention to provide a magnetographic copier having a movable carrier, wherein the problems of registration of the carriage in both the lateral and longitudinal directions are solved electronically.

In the present invention, a magnetographic copier/printer has a movable carriage in which all of the process stations involved with recording and developing of a magnetic latent image are mounted on the carriage and a ribbon of magnetic tape is threaded through these stations from supply and take-up spools which are stationarily mounted outside of the carriage. The tape is of a width compatible with the most convenient size of thin film head array, which thus determines the width of the bands that make up the final image. During copying, the tape is held stationary and the carriage is allowed to translate. As the carriage moves, the tape passes consecutively from one process station to the next. As a result of holding the tape stationary, problems of tape registration are avoided which would otherwise require expensive arrangement to maintain accurate carriage motion and carriage registration. A standard charge coupled device (CCD) array is used to scan the original document to be reproduced which digitizes the image and send the digitized data to the thin film head array. The data is shipped in a serial fashion between the CCD array and the thin film heads. Each CCD element would correspond to a thin film head array element in a one-to-one arrangement. After a section of the original document is recorded on the tape, the image is developed and printed on a recording medium such as paper. The scanning, imaging and printing of each succeeding segment of the original document is preferred until the entire document is printed on the recording medium. Means are selectively available for switching the input to the thin-film head array from the CCD array to a digital data stream suppled by a computer or other similar source.

DESCRIPTION OF THE PREFERRED EMBODIMENT

Figure 1:
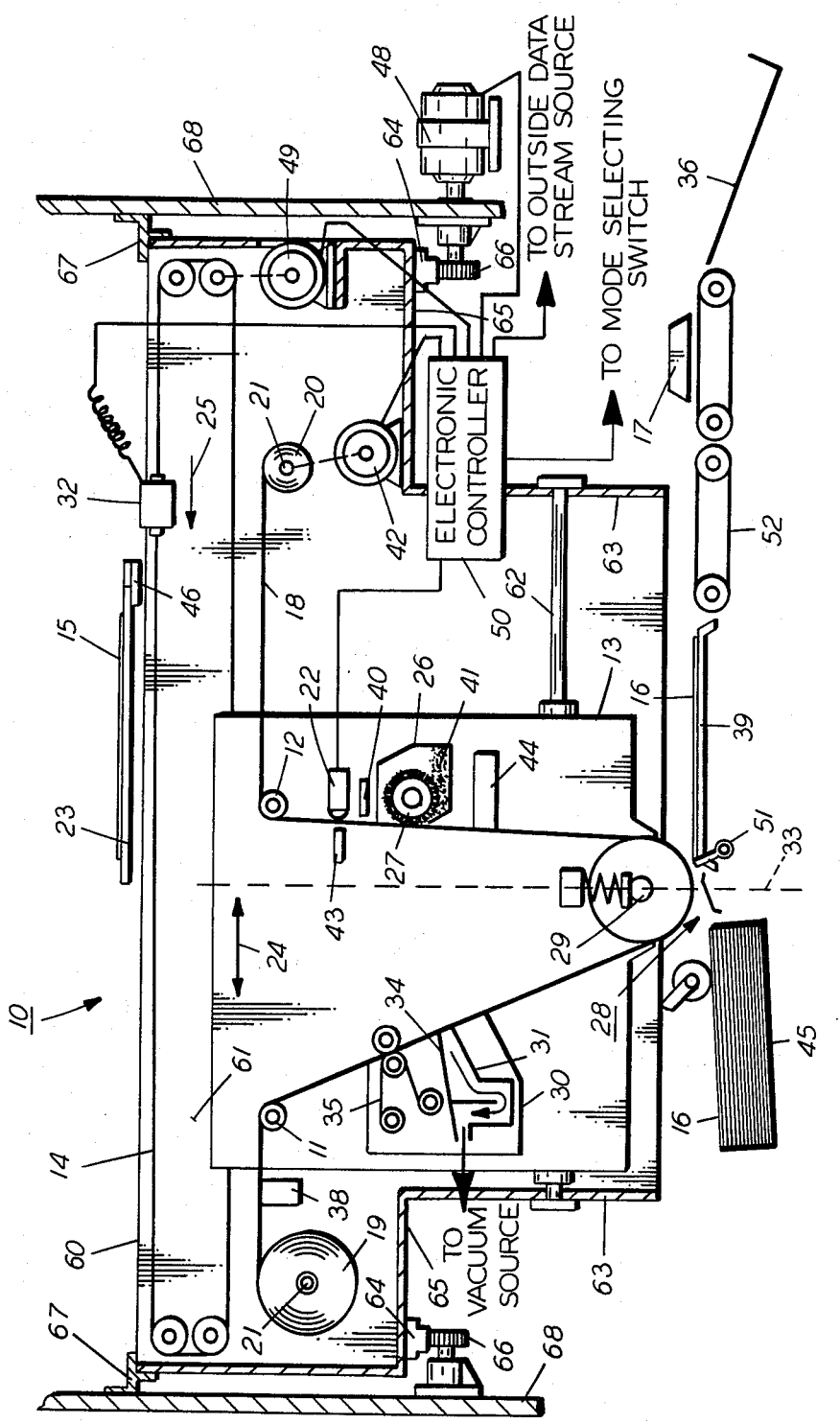
FIG. 1 is a side view diagram of the magnetographic copier/printer of the present invention.

FIG. 1 depicts a side-view diagram of the magnetographic carriage copier/printer 10 of the present invention. All of the process stations involved with recording and developing a magnetic latent image on a ribbon of magnetic tape 18 are mounted within a carriage 13. The magnetic tape 18 is threaded through the process stations and each end portion is wound, respectively, on a supply spool 19 and a take up spool 20. The spools are rotatably mounted on spindles 21 which are mounted outside the carriage 13 on side walls 61 (one shown) of movable housing 60. The tape 18 is of a width compatible with the most convenient size of the thin-film magnetic head array 22, which, in the preferred embodiment, is between 1 and 2 inches. The tape width, of course, determines the width of the successive and sequential bands or segments of the original document that are transferred from the tape to a copy recording medium 16, such as paper, to form and make up the final composite image that represents a copy of the document 15.

The process stations are mounted in the carriage 13 in the following order, first, the recording station comprising a thin-film, magnetic-head array 22, the development station 26, the transfer station 28 having a pressure transfer roller 29, and a cleaning station 30. The developing station may be of any magnetic development type which applies magnetic toner particles 41, to the latent magnetic image, but preferably is one having a magnetic brush 27 to bring the toner particles into contact with the latent image. The cleaning station 30 may be any one of a number of well-known configurations, but a two station cleaning arrangement is preferred having the residual toner first vacuumed off the tape by a vacuum system 31 via nozzle 34 and then removing the remainder of the toner particles by a relatively slow moving web 35 in pressure contact with the tape.

During copying, the tape 18 is held stationary by the supply and take-up spools 19, 20 and the carriage 13 translates in the direction of arrow 24, beginning from a start-of-scan position indicated by dashed line 33. As the carriage moves, it can be seen that the tape will pass consecutively from a position confronting the head array 22 through the various process stations one after the other. As a result of holding the tape 18 stationary, problems of tape registration are avoided, as will be more fully understood later.

The charge coupled device (CCD) array 32 is connected by a cable 14 to the carriage 13, so that when it moves in one direction, the carriage must move in the opposite direction. This direction of scan by the CCD 32, causes the head array 22 to produce a wrong-reading latent image on the tape. Therefore, the image transferred, after development, to the paper will be a right-reading image.

The CCD array in its start-of-scan position is to the right of the original document 15, as viewed in FIG. 1, and the carriage 13 is positioned generally to the left of the document. A plane passing through the axis of the pressure roller 29 in the transfer station 28 is perpendicular to the document 15 and intersects the plane of the platen 23 holding document at the left-hand edge thereof. As the CCD begins a scan, the CCD scans a segment of the document from right to left. The carriage, on the other hand, moves from left to right, the latent magnetic image being recorded on the tape in real time.

The carriage 13 may be mounted in any well-known manner so long as it may translate back and forth in the direction of arrow 24 under the force of cable 14. In FIG. 1, the carriage is depicted as slidingly mounted on a pair of shafts 62 (one shown). The shafts 62 are are mounted in lower end walls 63 of the movable housing 60. The original document 15 is positioned on the transparent platen 23 and remains stationary while it is being scanned by the CCD 32, one segment or band at a time. The CCD array is adapted to operate as a raster input scanner (RIS) and each element corresponds to an element in the thin film magnetic head array 22. Accordingly, there are about 300 elements per inch in both CCD array and head array which are connected in a one-to-one arrangement. The band of image scanned by the CCD array is digitized in a manner well-known in the art and sent to the respective elements of the magnetic head arrays. The data between the CCD array and the magnetic head array is shipped in a serial fashion.

As the CCD array 32 scans a segment of the document 15, the carriage 13 is translated in the opposite direction by the cable 14 which connects the CCD array to the carriage. The carriage movement causes the magnetic tape 18, which is held stationary, to be moved sequentially through the process stations. After the first scan, the carriage 13 and CCD array 32 return to the start-of-scan position, where they are stepped in a direction transverse to that of the scan direction for a distance equal to that of the width of the segment scanned. This procedure is repeated until the entire document is scanned, recorded and printed on paper.

The tranverse or lateral stepping of the carriage 13 and CCD 32 may be done in any manner well known in the art, but in the preferred embodiment shown in FIG. 1, this is accomplished by mounting them in movable housing 60. Housing 60 has racks 64 mounted on the bottom of intermediate floors 65 and the housing is translatingly supported by gears 66 mounted on the stationary main frame 68 of the printer 10 which engages the racks. The top side of movable housing 60 is guided by slide rails 67.

Each time the carriage 13 moves a full scan cycle (e.g., from the start-of-scan to the end-of-scan and back), the latent image is recorded on the magnetic tape 18 as the tape moves by the head array 22. The tape continues to move past the developing station 26, where the latent magnetic image is developed by toner particles 41, around the pressure transfer roller 29, where the developed image is pressure transferred to the paper 16 on fixed support plate 39, and through the cleaning station 30 where the residual toner particles are removed. The pressure transfer roller 29 is lifted by means well known in the art out of contact with the paper 16 when the carriage 13 and CCD array 32 are returned to the start of scan position. The movement by the pressure transfer roller 29 avoids background and ghosting problems that otherwise would appear in subsequent recording and printing.

Prior to the second scan by the CCD array 32, the CCD array and carriage 13 are stepped over a distance of one scanning width via movable housing 60 by a stepper motor 48, which rotates one of the gears 66. Thus, gears 66 through racks 64 laterally steps the movable housing 60. The direction of movement of the movable housing relative to FIG. 1 is in a direction perpendicular to the direction of the carriage 13 and CCD array 32 movement and in a direction into the surface of FIG. 1. The distance stepped is one scan width, hereinafter referred to as lateral movement or stepping. The carriage and CCD array lateral movement is relative to both the document 15 being scanned and the paper 16 receiving the developed image on fixed support 39. This step and repeat operation is repeated until the entire image has been printed. After the last sequential segment of the image is transferred and the entire image is on the paper 16, the paper is ejected past a means for fusing the toner particles 41 forming the image on the paper, such as by a radiant fuser 17. From the fuser 17, the paper 16 with a replica of the original document thereon is moved to a collection tray 36.

Periodically, it may be desirable to use a fresh section of magnetic tape 18. For example, the magnetic tape may become worn or scratched, so that poor copy quality reproductions are being encountered. When a new segment of tape is to be dispensed from the supply spool 19, a synchronizing track record head 38 writes a mark on the edge of the tape. For subsequent imaging with this new section of tape, this signal will be the clock that gates the CCD array 32 and the magnetic head array 22; that is, the copier will not start another scan by the CCD array until a photosensor 40 observes that the mark written by the track record head 38 has advanced thereby. The replacement of a segment of magnetic tape may be done automatically after a predetermined number of imaging cycles and/or manually by the operator. New sections of tape 18 are never advanced while the copier 10 is in the process of scanning and printing an original document 15 or in the time between the printing of successive bands or segments of the same document. As soon as the photosensor 40 observes the mark by the track record head 38, a signal is generated to stop the dispensing of the magnetic tape 18 from the supply spool. The supply spool is spring biased, when it is not dispensing tape, to keep a proper tension of the tape around guide rollers 11 and 12 and the pressure transfer roller 29. The take-up spool 20 is operated by a clutch and motor 42 when a new segment of tape is to be advanced. The photosensor signal also de-energizes the take-up spool motor 42. The track record mark will stop at a location just below the head array 22, and will be cleaned off by a special cleaning station 44 before the next developed image on the tape 18 reaches the transfer station 28.

Spaced at periodic intervals along the tape 18 are holes (not shown) which serve as a "start" of writing" indication. These holes will be placed in the magnetic tape 18 during manufacture. As the carriage 13 begins a traverse or scan cycle in response to a scan by the CCD array 32, an optical sensor 43 detects the edge of the next hole in the tape and, upon detection, enables both the CCD array 32 and the magnetic head array 22. From scan-to-scan, therefore, the start of scanned segments of the document 15 should line up, since the start pulse is derived from the tape (that is tape holes,) which tape is never moved during the scanning/printing operation.

Figure 2:
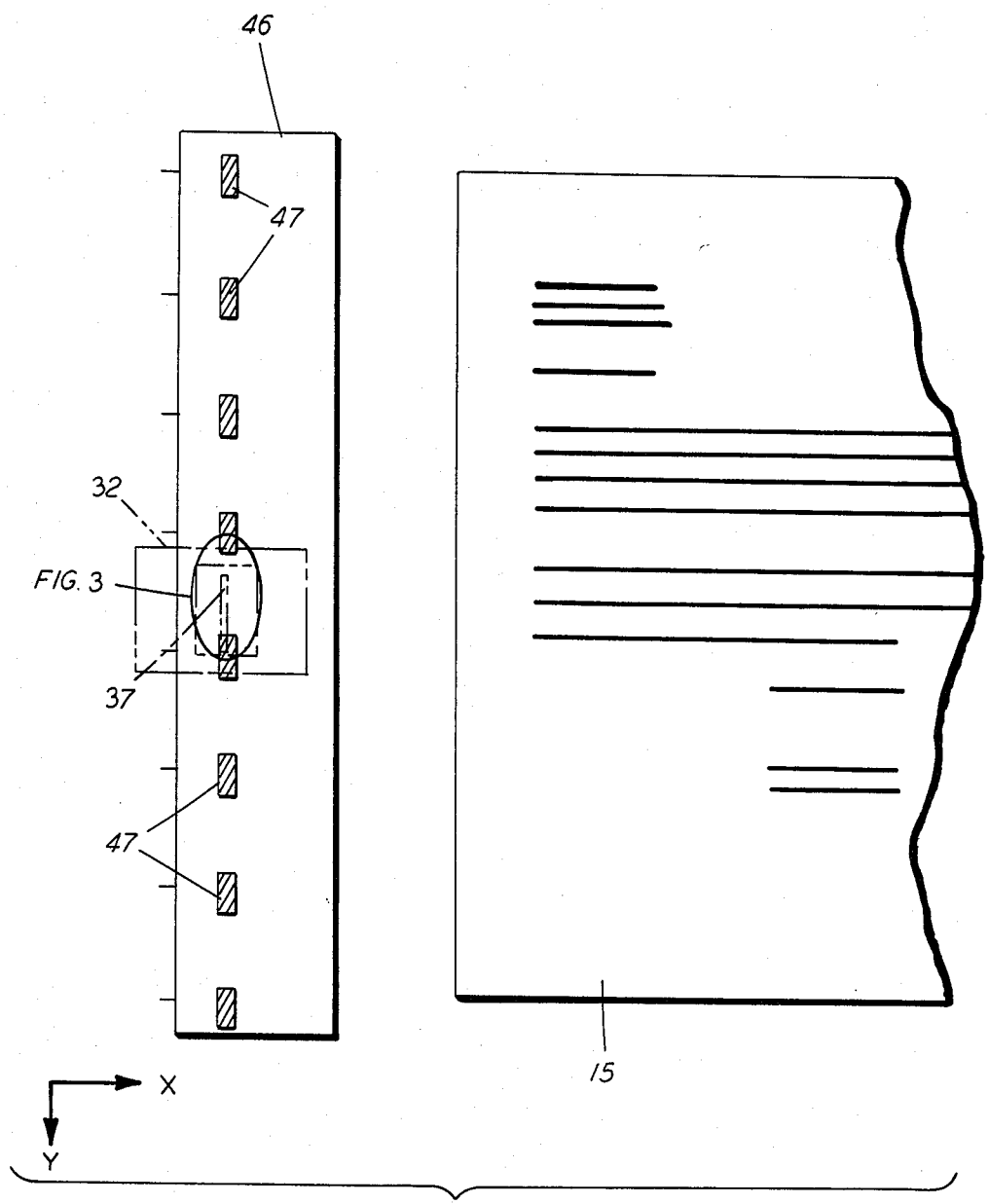
FIG. 2 is a partial plan view of a schematic representation of the magnetographic copier/printer of FIG. 1 showing the CCD array and the printed code strip used in electronically registering the CCD array.

Referring to FIG. 2, registration in the lateral stepping direction Y is achieved through the use of a printed code strip 46 rigidly mounted on the stationary platen frame (not shown) of the copier 10 during manufacture and assembly thereof. The codes comprise a series of dark areas 47 spaced along the code strip 46 at intervals equivalent to the nominal distance of CCD scan width and also one lateral step or segment width by the carriage 13 and CCD array 32 in movable housing 60. When the carriage 13 is in the start-of-scan position 33, the CCD array 32 will "see" this code strip. A stepping motor 48 is used to drive the carriage 13 and CCD 32 via movable housing 60 in the lateral direction Y, thus, insuring that each lateral step down the original document 15 will nominally be the correct distance. However, because mechanical system errors are always present, the movable housing 60 may not move exactly the same distance for each lateral movement. If the movable housing moves the nominal distance, then some number of CCD elements 37 on one end of the array, e.g., 15, will be able to see the black area 47. If the movable housing and thus the carriage 13 and CCD 32 move some distance greater or lesser than the nominal distance, then a greater or lesser number of CCD elements 37 will see the black area 47. From this information, an electronic controller or microprocessor 50 will be able to calculate the exact position of the carriage 13 and CCD 32 relative to the elements 37 and the document 15, prior to scanning by the CCD in the X direction.

In the example above, the 15 CCD elements 37 that see the black area 47 of the code strip 46 will correspond to an associated 15 thin-film magnetic head elements. These 15 elements serve as a sort of buffer at the edge of the image area on the magnetic tape. When the carriage and CCD are moved the nominal distance for one lateral scan step and 15 CCD elements on one end of the array sees the black area, they are not enabled for sensing. The associated 15 thin-film head elements are likewise not enabled for recording. If the distance moved is something other than the nominal distance, the electronic controller 50 will enable or disable a greater or lesser number of CCD elements 37 and associated thin-film head array elements to insure proper stitching between scanned segments of the original document 15 copied.

Figure 3:
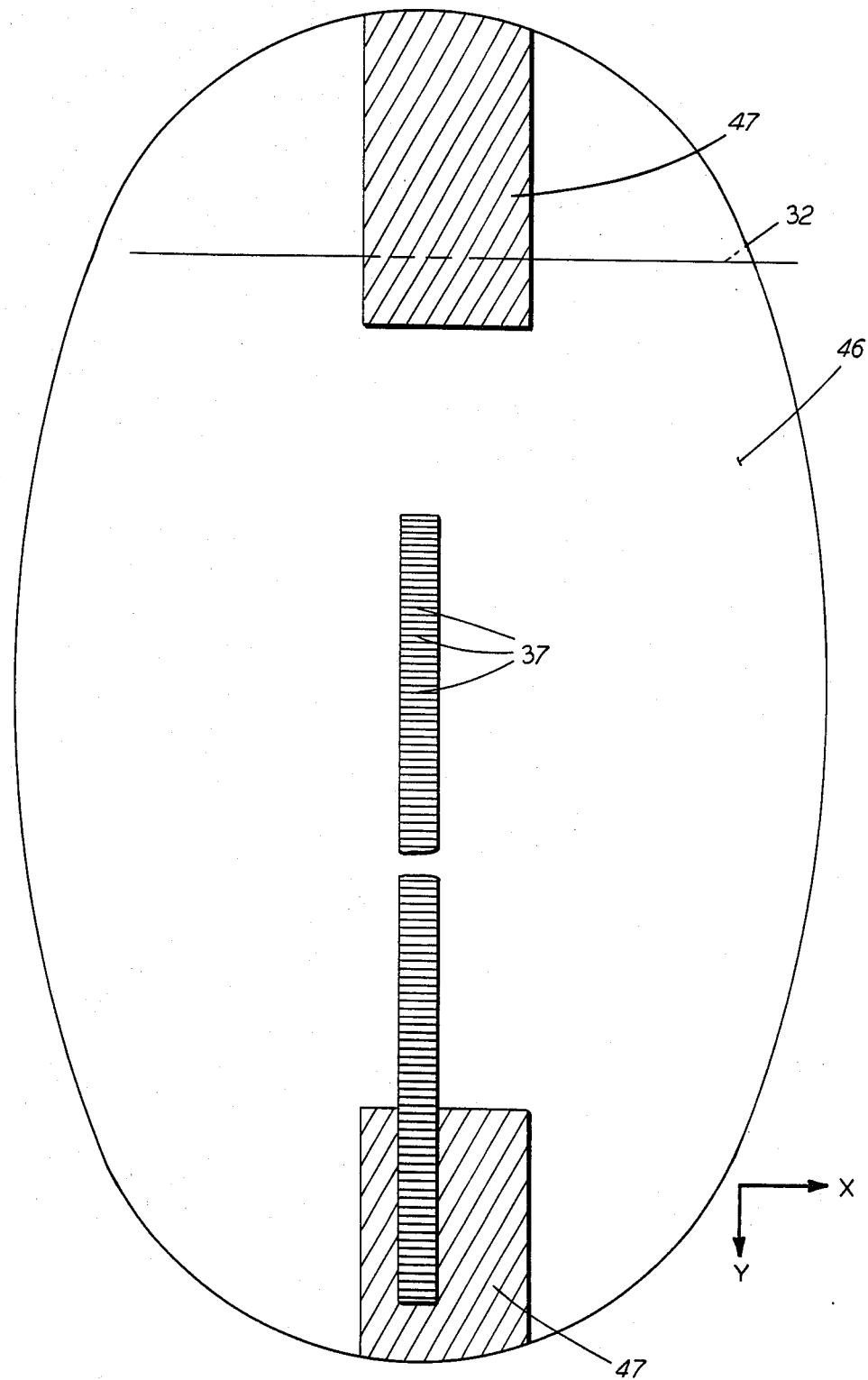
FIG. 3 is an enlarged portion of FIG. 2 showing the CCD elements which sense the code strip.

During normal operation a certain number of elements on each end of the CCD array 32 are not used. Referring to FIG. 3, the CCD array elements 37 are shown as a linear array of 300 elements one inch wide. If the carriage translates in the lateral direction Y the exact distance, CCD elements numbered 15 through 285 are enabled and used for the next scan segment of the document because elements numbered 1 through 15 see the black area 47. If the movable housing containing carriage 13 and CCD 32 moves some distance greater or lesser than the exact distance, the controller 50 can determine the position of the CCD relative to code strip 47 by the number of CCD elements 37 which sees the black area 47. Depending on the distance moved, the controller 50 will enable 270 consecutive CCD elements, but the precise elements enabled vary depending on the number which see the black area 47; e.g., the elements 37 which are enabled may be CCD elements numbered from 10 through 280 or from 30 through 300 or from 5 through 275 etc. Since each CCD element 37 corresponds to a discrete magnetic recording head element, only those recording head array elements which match enabled CCD elements will be enabled.

This method provides for proper stitching between scanned segments of the original document, and, ultimately, the proper stitching between the developed images transferred serially to the paper 16 to form a copy of document 19.

Copy paper 16 is provided from a supply tray 45 located below the carriage 13. At a start of scan by the CCD array 32, a sheet of paper 16 is fed from the tray 45 by well known means and registered on fixed transfer plate 39 where the paper will serially receive the image segments of the original document 15 at the transfer station 28. Neither the original document 15 nor the copy paper 16 moves during the copying and printing process. After the complete image has been transferred to the copy paper 16 from the magnetic tape 18 by the pressure transfer roller 29, the paper is moved by a well known means, such as an ejection finger 51, into a transport belt conveyor 52 to a radiant fuser 17 and then into a collection tray 36.

In recapitulation, a carriage type magnetographic copier 10 is described which operates as a real-time raster input scanner/raster output scanner (RIS/ROS), wherein the CCD array 32 serves as the RIS and the thin-film magnetic head array 32 serves as the ROS. Because the copier has a fixed platen 23, it is capable of either single document or book (three dimensional) copying. Each element 37 of the CCD array 32 is connected to an associated element in the magnetic head array 22. Each array has 300 elements per inch for high quality copying. The recording and printing process stations are mounted on a movable carriage 13 through which a ribbon of magnetic-tape 18 is threaded. The tape 18 is held stationary during the copying mode, so that as the carriage 13 moves, the tape passes through the various process stations. The CCD array 32 is attached by cable 14 to the carriage 13 for accurate stitching or placement of the developed image segments of the original document 15 on the copy paper 16 by the pressure transfer roller 29 at the transfer station 28. Otherwise, a tolerance buildup between the start of scan by the CCD array 32 and the start of recording on the magnetic tape 18 would cause the segments transferred to the copy paper 16 to align improperly; that is, the beginning and end of the segments would not match or line up on the copy paper. To further assist in the alignment, holes are punched in the tape 18 during manufacture thereof which are sensed to exactly initiate the start of scan and concurrent start of recording. The tolerance between segments or bands of image making up the copy of the original document 15 is maintained by a code strip 47 on the fixed portion of the copier frame. More elements of the CCD array 32 and the correspondingly connected magnetic head array elements are available than are necessary to produce a band or segment of the original document 15. Accordingly, marks 47 accurately placed on the code strip 46 are sensed by the CCD array elements 37 when the CCD array 32 and carriage 13 are stepped by movable housing 60 in the direction (Y direction) transverse to the scanning direction (X direction) to produce the subsequent image bands that make up the total image. An electronic controller 50, such as a standard microprocessor, does not enable those CCD array elements 37 which see the code strip marks. A stepper motor 48 is used to move the CCD array 32 and carriage 13 via the movable housing 60 over to the next segment of the original document 15 to be scanned. The combination of the code strip marks 47 read by the CCD array elements 37 for scanning width control and the holes in the magnetic tape 18 for start of scan control and the interconnecting cable 14 between the CCD array and the carriage provides accurate, error-free segmental copying of an original document.

Such a magnetographic, carriage-type printer/copier 10 which records, develops and transfers the image on a ribbon of magnetic tape 18 that does not move during the recording/printing process, but is conveniently replenished when desired, provides a high copy quality device with high quality maintainability in a very cost effective manner.

Many modifications and variations are apparent from the foregoing description of the invention and all such modifications and variations are intended to be within the scope of the present invention.

We claim:

1. A magnetographic carriage printer for reproducing documents placed on a fixed platen thereof when a reproduction mode of the printer is activated, comprising:

means for scanning segments of a document placed on the fixed platen, the scanning means moving from a start-of-scan position across the document in a scanning direction to an end-of-scan position and returning to the start-of-scan position, said scanning means being adapted to scan uniformly wide segments of the document and to convert the scanned segments into digital image data signals;

means for moving the scanning means in a direction transverse to said scanning direction upon each return of the scanning means to the start-of-scan position during the reproduction mode, the moving means relocating the scanning means for a distance equal to the width of one segment so that segments of said document are sequentially scanned until the entire document has been scanned;

a magnetic tape having a magnetizable surface for recording latent magnetic images thereon, the width of the magnetic tape being determined by the width of the segment scanned by the scanning means;

a movable carriage having mounted thereon a magnetic recording head for receiving the digital image data signals from the scanning means and for recording them on the magnetic tape as latent magnetic images, a means for developing the latent magnetic images with toner particles, a means for transferring the developed images to a copy medium, and a means for cleaning any residual toner particles from the tape to prepare it for reuse, the magnetic tape being positioned in operative relationship with the recording head, developing means, transferring means and cleaning means;

means for interconnecting the scanning means to the carriage so that they move concurrently and in a predetermined, fixed relation to each other;

means for mounting the magnetic tape, said means for mounting being adapted to hold the tape stationary during the reproduction of a document by the printer, so that as the carriage moves the tape passes by the recording head, developing means, transferring means and cleaning means;

means for activating said scanning means at a predetermined time as it moves from a start-of-scan position to scan each segment of the document to be reproduced, so that the beginning and ends of the transferred image segments are accurately aligned on the copy medium; and means for controlling the width of the segment scanned by said scanning means to insure that each scanned segment has the same width, so that the transferred image segments are accurately stitched together to form a high quality reproduction of the document.

2. The printer of claim 1, wherein the means for scanning is a charged coupled device (CCD) adapted for scanning and return movement and means for moving said CCD, the CCD having a plurality of sensing elements in a linear array which are connected to individual, associated recording elements of the magnetic recording head in a one-to-one manner.

3. The printer of claim 2, wherein the means for moving the CCD in a transverse direction is a movable housing having both the CCD and carriage mounted therein, said housing being adapted for movement in a direction transverse to that of the CCD scanning direction and having drive means capable of moving the housing substantially equal distances in the transverse direction at the conclusion of each CCD scan and return until said document has been entirely scanned and recorded on the magnetic tape.

4. The printer of claim 3, wherein the means for interconnecting the CCD to the carriage is a cable, said cable being mounted for movement and arranged so that movement of the CCD causes the carriage to move in an opposite direction.

5. The printer of claim 4, wherein the means for mounting the magnetic tape comprises:

a supply spool and a take-up spool, said spools being rotatably mounted on spindles, said spindles being located outside the carriage and mounted on the movable housing so that the tape travels concurrently with the CCD and carriage in the transverse direction.

6. The printer of claim 5, wherein the means for activating the CCD comprises:

placing accurately spaced holes in tape;

a photosensor for sensing said tape holes and for producing a signal indicative thereof, the photosensor being located at a predetermined location in the vicinity of the recording head; and means responsive to the photosensor signal to energize the CCD, so that each CCD scan initiates tape recording by the recording head at precisely the same location on the tape to assure proper margin alignment of each developed image segment transferred to the copy medium.

7. The printer of claim 6, wherein the means for controlling the width of the segment of the document scanned by said CCD comprises:

providing more CCD sensing elements and more associated recording elements than are necessary for segmental scanning and recording of the document;

an elongated code strip accurately mounted on the fixed platen along the edge thereof which is perpendicular to the CCD scan direction and which edge is adjacent the CCD at its start-of-scan position, the code strip having equally and accurately spaced marks thereon, each of said marks being spaced so that at least one of the sensing elements of the CCD sense a one of the marks before each segmental scan of the document by the CCD; and means for enabling a predetermined contiguous number of CCD sensing elements which immediately follow those sensing elements which sense said code strip marks, whereby the scanning elements which sense the code strip mark are not enabled and at least one CCD sensing element on the other end of the sensing array is not enabled.

8. The printer of claim 7, wherein the printer further comprises;

means for dispensing a fresh portion of magnetic tape from the supply spool;

means for taking up the previously used portion of the magnetic tape on the take-up spool;

means for marking the beginning of the fresh portion of tape, said marking means applying a removable mark on the tape;

means for sensing the tape mark and providing a signal indicative of said sensed mark, the sensed mark signal being used to stop the tape dispensing and taking up means so that the fresh portion of the tape becomes stationary again relative to the movable housing; and means for removing the tape mark prior to that portion of the tape reaching the transferring means, so that the tape mark is not transferred to the copy medium.

9. The printer of claim 8, wherein the means for transferring the developed images comprises:

a pressure transfer roller which is moved from a transfer position to a non-transfer position when the carriage has completed a path of travel caused by the movement of the CCD from its start-of-scan to the end-of-scan position; and a fixed support for receiving and holding the copy medium stationary while the developed images are being serially received from the magnetic tape by the copy medium.

10. The printer of claim 9, wherein the printer further comprises means for selectively receiving digital image data signals from sources outside the printer instead of from the CCD at the option of a user of said printer.

11. A magnetographic carriage printer which functions as a real-time raster input scanner/raster output scanner (RIS/ROS) when reproducing copies of documents placed on a fixed platen thereof comprising:

- a charge coupled device (CCD) having an array of sensing elements and adapted to scan a document on the platen in a scanning direction one segment at a time, the CCD returning to a start-of-scan position after scanning each segment and being stepped in a direction transverse to the scanning direction for a distance of one segment width before scanning the next segment in a continual scan, step and repeat manner until the entire document is scanned;
- a fixed substrate for supporting a copy medium;
- a ribbon of magnetic tape being held stationary during the reproduction of documents;
- a movable carriage containing a magnetic recording station, a developing station, a transfer station and a cleaning station, the carriage being connected to the CCD for concurrent but opposite movement therewith during the scanning and return of the CCD and for concurrent movement in the same direction of the CCD during the transverse stepping of the CCD;
- said magnetic tape being threaded through the stations, so that the movement of the carriage causes the tape section at the recording station to pass through all of the stations sequentially prior to the return of that tape section to its original position when the carriage returns to the start-of-scan position with the CCD;
- said recording station comprising a thin-film recording head having an array of recording elements connected to the CCD sensing elements in a one-to-one fashion, so that the digitized image data from each CCD element is received and recorded on the magnetic tape by an associated recording element;
- said transfer station having a retractable pressure transfer roller which retracts when the carriage is moving in the return direction and which urges the transfer roller with the magnetic tape therebetween into contact with the copy medium when the carriage is moving in the scan direction to transfer and print the developed magnetic image on the tape of the copy medium;
- means for registering the start-of-scan by the CCD with the start-of-recording by the recording head by electronically sensing fixed positions on the magnetic tape; and
- means for enabling precise number of predetermined CCD elements and associated recording head elements by electronic sensing of fixed code marks by the CCD elements prior to each scan, so that the problems of carriage and CCD registration are solved electronically and that the transferred segments of developed images are accurately aligned on the copy medium during transfer to produce a high quality copy of the documents reproduced.

12. A magnetographic carriage printer having a thin-film magnetic head with an array of recording elements for copying documents placed on a fixed platen of the printer when in a copying mode and for printing digital data streams or video signals supplied from an outside data source when in a printing mode, the carriage printer comprising:

- means for switching the carriage printer to either the copying mode or the printing mode;
- a movable carriage in which all process stations involved in recording and developing a latent magnetic image on ribbon of magnetic tape are mounted on said carriage, the carriage being movable from a start-of-scan position to an end of scan position and return for one scan cycle, and the carriage being stepped in direction transverse to the scan direction after each scan cycle;
- the ribbon of magnetic tape being threaded through the process stations and held stationary while the printer is copying or printing, so that the tape passes from one process station to the next as the carriage moves;
- a charge coupled device (CCD) having an array of sensing elements for scanning the document one segment at a time, each CCD element corresponding to one of the magnetic head elements in a one-to-one arrangement, so that the scanned segment of the document, which is digitized by the CCD, is recorded on the tape by the magnetic head, the CCD being movable from a start-of-scan position to an end-of-scan position and return for one scan cycle to scan one segment of the document, and the CCD being stepped in a direction transverse to the scan direction after each scan cycle for a distance equal to the width of a segment, the scanning and stepping of the CCD being continued until the entire document has been scanned;
- means for connecting the CCD to the carriage in order that they move in unison and in predetermined directions for predetermined distances;
- a copy medium being held stationary on a fixed support adjacent the transfer station to receive a developed image representing one segment of the document for each scan cycle of the carriage;
- means for driving the CCD and carriage during the scan cycles and stepping movements;
- means for determining the start-of-scan positions of the CCD;
- means for selectively enabling the CCD elements and corresponding magnetic head elements to enable accurate segments of the document to be scanned and recorded, so that the transferred developed images are stitched together to produce a high quality copy of the document; and
- means for controlling the operation of the process stations, driving means, determining means and enabling means in timed relation with each other.

* * * * *